United States Patent
Diederichs et al.

(10) Patent No.: US 7,486,495 B1
(45) Date of Patent: Feb. 3, 2009

(54) NETWORKED SERIES OF SENSORS HAVING DISTRIBUTED MEASUREMENT AND CONTROL FOR USE IN A HAZARDOUS ENVIRONMENT

(75) Inventors: Robert Diederichs, Edmonton (CA); Thomas Michael Madden, Duncan, OK (US); Jerry Yee, Edmonton (CA)

(73) Assignee: Cameron International Corporation, Houston, TX (US)

( * ) Notice: Subject to any disclaimer, the term of this patent is extended or adjusted under 35 U.S.C. 154(b) by 444 days.

(21) Appl. No.: 11/435,346

(22) Filed: May 16, 2006

Related U.S. Application Data

(60) Provisional application No. 60/684,604, filed on May 25, 2005.

(51) Int. Cl.
*H02H 1/00* (2006.01)

(52) U.S. Cl. ............. 361/119; 340/870.07; 700/150; 700/266

(58) Field of Classification Search .......... 361/119; 340/870.07; 700/150, 266
See application file for complete search history.

(56) References Cited

U.S. PATENT DOCUMENTS

| | | | |
|---|---|---|---|
| 4,691,384 A | 9/1987 | Jobe | |
| 5,200,743 A * | 4/1993 | St. Martin et al. | 340/3.51 |
| 5,583,764 A | 12/1996 | Nail et al. | |
| 5,712,631 A * | 1/1998 | Lewis et al. | 340/853.1 |
| 6,002,996 A | 12/1999 | Burks et al. | |
| 6,013,108 A | 1/2000 | Karolys et al. | |
| 6,154,683 A * | 11/2000 | Kessler et al. | 700/150 |
| 6,285,912 B1 | 9/2001 | Ellison et al. | |
| 6,450,254 B1 | 9/2002 | Hoyle et al. | |
| 6,731,223 B1 | 5/2004 | Partyka | |
| 6,832,251 B1 | 12/2004 | Gelvin et al. | |
| 2001/0013826 A1 | 8/2001 | Ahmed et al. | |
| 2001/0034567 A1 * | 10/2001 | Allen et al. | 700/283 |
| 2003/0219062 A1 | 11/2003 | Egidio | |
| 2004/0059440 A1 | 3/2004 | Renner | |
| 2005/0068710 A1 * | 3/2005 | Burr et al. | 361/119 |

OTHER PUBLICATIONS

Declaration Concerning Experimental Use, Sep. 2004, 2 pages.

* cited by examiner

*Primary Examiner*—Timothy Edwards, Jr.
(74) *Attorney, Agent, or Firm*—Fletcher Yoder

(57) ABSTRACT

The invention is a networked system of devices positioned in a hazardous environment to monitor or control process conditions. The devices include sensors such as pressure measurement elements and controls such as variable voltage outputs. The sensors detect process conditions and the controls manipulate process conditions, and they are monitored and controlled by slave devices having, generally a microprocessor and having associated memory to receive and record the sensor/control data. The network includes master devices; each master device may be associated with one or more slaved devices and associated sensors, where the master device communicates to its associated slave devices through a digital communication bus. The master device can automatically detect its associated slave devices and detect the communication and data characteristics of the slave devices. The master may also set parameters for detected slave devices, such as needed for computations performed by the master (using its own microprocessor) using data received from the slave device(s). The master device receives slave device data by requesting or polling the data from the slave device over the digital communication bus.

18 Claims, 10 Drawing Sheets

NETWORKED SERIES OF SENSORS HAVING DISTRIBUTED MEASUREMENT AND CONTROL FOR USE IN A HAZARDOUS ENVIRONMENT

This application claims the benefit of U.S. Provisional Application No. 60/684,604, filed May 25, 2005, which is hereby incorporated by referenced herein in its entirety.

FIELD OF INVENTION

The invention relates to distributed network systems of semi-intelligent sensors, particularly, to networked sensors that interface through an intrinsically safe (IS) barrier.

BACKGROUND OF THE INVENTION

Sensors and controls are routinely deployed in plants and facilities to detect and control process conditions, equipment conditions, and environmental conditions. Many of these sensors/controls will be electrically tied to a master control panel or control area for monitoring/control of the sensors at a common location remote from the sensor. At the master control panel, actions can be undertaken to change a sensor/control state or configuration, log sensor/control data, or simply monitor the sensor/control for use in controlling the facilities' performance. Generally, the master control panel is located behind an IS barrier (in the safe area), as sensors/controls can be located in hazardous environments. Prior art measurement and control systems for use in hazardous locations consist of single, high-function devices which are responsible for gathering all of the data through a fixed number of dedicated inputs and implementing all of the control functions through a fixed number of dedicated outputs. All of the collection, computation and control must fall within the predefined capabilities of these devices. Consequently, these prior systems either contain more capabilities than required, are designed to meet only the required capabilities, or do not contain sufficient capabilities to meet the data measurement and archiving requirements. These single devices offer limited expansion capability and must be replaced with another device having greater capabilities if the system's application requirements are increased. Intrinsic safety concerns with a single high-function device increase with every input or output connected to the device. In order to maintain safe operating conditions in a hazardous area, the overall system needs to be carefully designed for intrinsic safety and the installer/system designer must exercise great care to ensure that intrinsic safety is not violated. These restrictive safety requirements limit the capacity of batteries placed in the hazardous location. The power requirements of these higher-function devices and the need for safety components also prevent miniaturization of these systems.

Some facilities have provided for communication between sensors to allow data from sensors/controls to be shared, such as in a master/slave relationship. However, use of networked devices behind an IS barrier provides severe power restrictions on downstream devices due to the nature of an IS barrier, and hence limits the ability to install devices on a network with a common power bus. Even with networked sensors, control of downstream networked devices generally resides in a remote sensor monitoring site, where data is stored and archived. As real time communication is ongoing between the sensor/control devices and the remote monitoring site, it is difficult to control power consumption. Further, when additional sensor/control devices are added to an existing configuration where data is to be shared between devices, existing devices must be manually modified to share and use the new device's data. This requires user intervention and is a cumbersome and time consuming process.

It is desirable to have a distributed sensor/control device network where local data is stored and transmitted upstream upon request of an upstream device. It is desirable to have low power consumption devices, with battery backup shared between devices to allow for continued operation when the supplied power feed is interrupted; it is desirable to have sensor/control devices with the ability to communicate characteristics between devices, including communication parameters, to allow devices to detect new devices placed on the network, determine device characteristics, and allow for integration of the new device into the network by allowing upstream devices to set configuration parameters to downstream devices.

DESCRIPTION OF THE PREFERRED EMBODIMENT

Figure 1:
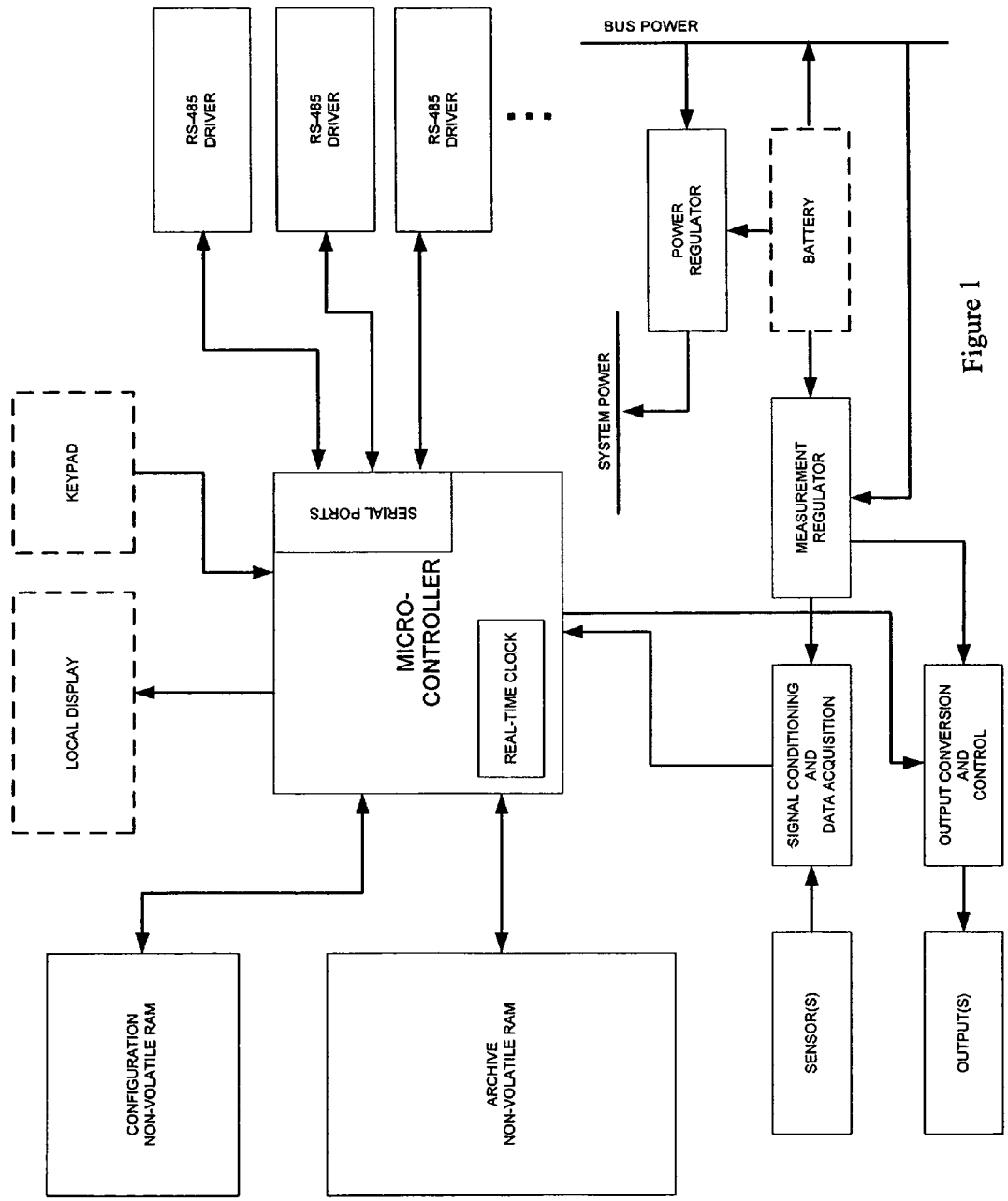
FIG. 1 is a schematic showing the general electronic components of a device deployed in the network structure.

The invention is a distributed architecture of networked devices intended for hazardous area measurement and control applications, typically used in the oil and gas industry. The architecture of this network ensures that the functions required in measurement and control, including data archiving, are distributed among multiple devices. As a result, the function of the networked system is not limited to the capabilities of any one device. It is preferred that each device is focused on a single measurement or control function so that it can be optimized to perform that function with the lowest power requirements and in a timely manner. It is also preferred to construct the distributed devices such that the analysis for intrinsic safety is greatly reduced and the number of devices that can be placed in the hazardous area on the network is greatly increased because of low voltage and low current usage. Collectively, these single-function devices form a distributed data collection, archive and control system that is both expandable and adaptable. Additionally, the devices can contain multivariable sensors, such as a device with sensing elements for measuring static pressure, differential pressure and temperature. The devices have varying levels of functionality and are categorized into functional tiers. Tier 1 (T1) has the lowest level of functionality. Tier 2 has the functionality of T1 and some additional features. Tier 3 (T3) is the tier with the highest level of functionality. Some of the tiered devices primarily perform measurement and logging of their intended parameter; others perform these functions in addition to advanced algorithms, such as calculating flow rates in accordance with applicable standards. The devices communicate via an industry standard protocol, such as Modbus, over an industry standard RS-485 network. Devices can function individually as part of a heterogeneous system with third-party hosts, acting as a regular Modbus transmitter. However, when a device is used with other devices specifically created as T1, T2, or T3 devices, it becomes part of an integrated, distributed network of collaborating devices. Multiple sections of the architecture may be implemented in a single electronic device, in multiple devices, or on a PC. Networks can be tailored to fit any custom application without waste of unused capability. Such networks remain adaptable as system needs grow, and can be readily expanded with only incremental costs and without discarding existing components. Consequently, the network enables an advantageous business model in which the quoting and system design stages of a particular implementation of the network can be easily custom tailored to the exact requirements. Thus, a system minimizes unused portions of equipment, which is often offered at a discount, resulting in the minimizing of system testing during manufacturing which reduces manufacturing cost. The distributed architecture also creates significant advantages during the product development phase of the network devices. Networked devices all share a reusable hardware/software structure which reduces required development and product testing to a small portion of its overall functionality (i.e. the portion of the device dedicated to measurement or control).

The devices in the invention are generally designed to be powered from the power output of the intrinsically safe (IS) barrier, through an intrinsically safe bus. The IS barrier limits the amount of electrical energy introduced into a hazardous area to prevent the ignition of explosive atmospheres. The IS bus includes a power network component and a communications network component; power and communications for devices are provided on four conductors for use in hazardous areas. The preferred communications network configuration is in accordance with EIA RS-485. The IS bus power is a combination of low-voltage, low-current parameters matched with extremely low-power budget devices that have minimal energy-storing capabilities to facilitate hazardous area approval. Devices may or may not contain an intrinsically safe battery. The total bus power consists of power supplies extending from the safe area through the IS barrier, combined with the power from batteries installed within the individual devices in the hazardous area. The system has a unique device entity parameter scheme accepted by CSA that allows for simple calculation of system entity parameters without having to perform detailed IS analysis of all components on the bus. This greatly simplifies installation and site certification and ensures that safe operating conditions can be achieved by personnel with minimal knowledge of electrical safety. The bus entity parameters allow for unique, ultra-miniature device construction without the need for protective measures (increased component and trace spacing, protective diodes and resistive devices) in the circuits in the hazardous area. As a result, full microprocessor-based systems can be located within the sensor's housing, rather than within a separate enclosure.

The devices' ability to operate directly from small battery packs of 1 to 4 battery cells eliminates the need for complicated power-conversion circuitry. It is preferred that the IS battery packs be comprised of lithium, 3.6 VDC, primary cells. The devices can operate on power from the IS barrier during normal usage; in the event of barrier power failure, the bus will operate on the batteries in the devices. Each device dynamically selects its power source, preferring the higher voltage source of the power from the IS barrier in the safe area over the voltage provided by batteries on the network. Because the batteries installed in devices contribute to the IS bus power, they can also power other devices on the bus that do not have batteries in the absence of power from the safe area. Each network of devices can contain up to five 33-amp-hour batteries. It is preferred that all of the devices on the bus operate with a low-power budget such that they consume no more than 8 amp-hours per year.

The IS bus interfaces the non-hazardous or safe areas through an IS barrier. The IS barrier is an electronic device that limits the energy allowed into the hazardous area for communication and power on a 4-wire bus. It provides connections for the wiring entering into the hazardous area and non-hazardous areas. The IS barrier is typically rated as a Class I, Division 2 device, allowing installation in certain types of hazardous areas while providing safety for Division 1 areas. The IS barrier can also be used as a patch between legacy RS-485 networks and the transmitters described in this document in the hazardous area. The barrier provides maximum protection on the non-hazardous side (up to 250 VAC@1000 A), allowing the network to be interfaced in the harshest of electrical conditions. The barrier allows up to 450 uF of capacitance on the bus and up to five 33-amp-hour batteries in the hazardous area that can provide power to the bus in addition to the instrument in which it resides. The barrier converts the hazardous communication bus to multiple connection types on the non-hazardous side including: RS-232, RS-485, and USB. It is preferred that each device on the bus have minimal capacitance and generally operate with 20 to 30 uF, allowing for 15 to 22 devices on the power bus.

On the hazardous side of the IS barrier, a series of networked devices is connected to the IS bus. For ease of organization, the networked devices are categorized into three tiers: T1, T2 and T3. Each device is microprocessor-controlled, with a typical hardware implementation as depicted in FIG. 1.

Typically, T1 devices are connected directly to sensors or may incorporate a sensor (for measuring pressure, temperature, flow rate, etc.) with the circuitry required for converting analog sensor data to digital data (if the sensor does not perform this function). T1 devices typically have the capability to archive sensed data and generally communicate with other higher-tiered devices (T2 or T3) only upon a query from a T2 or T3 device. T2 devices, which may include sensors, have the ability to query other T2 and T1 devices and combine data from its sensors and/or queried devices in stored algorithms. T3 devices generally have no sensors and operate more in a control and computational mode. T1, T2 and T3 devices include storage areas for archiving sensed data and computed data.

To maximize flexibility and liberty in the circuit design of the T1, T2 and T3 devices in the hazardous area, two assumptions are made regarding abnormal operating conditions. The first assumption is that the four electrical conductors that make up the IS bus are configured in a manner that poses the greatest possible safety threat—that is, shorted together within the hazardous area. Secondly, it is assumed that all energy-storing components (capacitors and inductors) on devices in the hazardous location are connected in the worst possible configuration regardless of their placement within the device's circuit. For instance, the sum of all inductance present on the circuit is treated as though it is configured in series with the bus and the sum of all capacitance on the device is treated as though it is in parallel with the bus. These assumptions eliminate the need to design regular safety measures into the circuitry of each device. Consequently, the devices can be significantly miniaturized, and the responsibility of safe operation is shifted to the selection of the maximum bus entity parameters for the entire network. A preferred combination of IS parameters is 300 mA, 450 uF and 5.88V on the power conductors of the bus, of which 100 mA may be supplied from a single IS barrier and the remaining contributing current may be supplied by up to five IS battery packs of various construction. The preferred barrier construction consists of discrete fuses, diodes and wire-wound resistive elements that limit the energy supplied to the bus to meet this preferred parameter combination. The communication conductors are protected such that higher voltages of both positive and negative polarities may not pass into the hazardous area.

Figure 2:
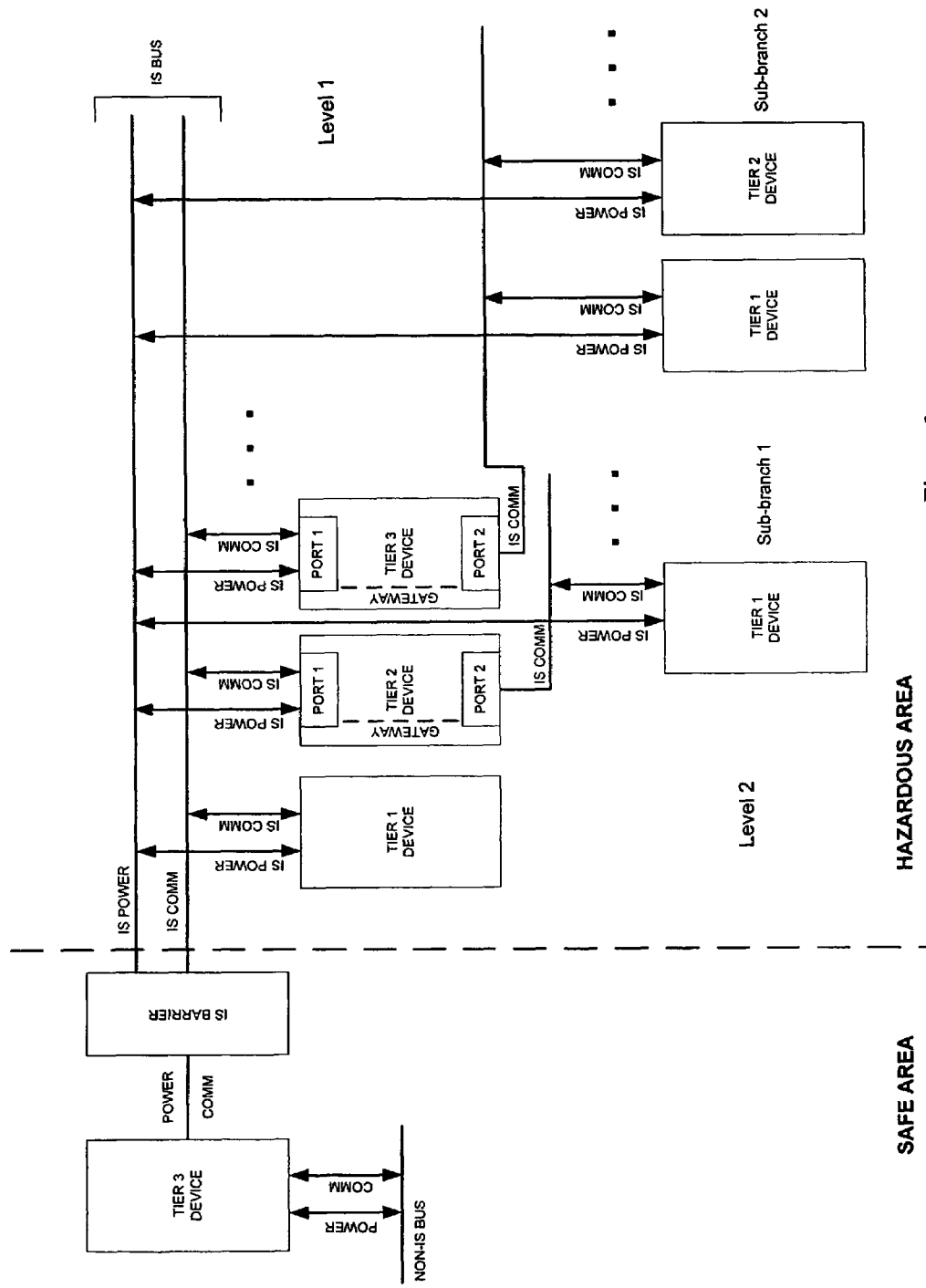
FIG. 2 is a schematic showing the tiered structure of the network and the power and communication buses within the network.

The IS network bus to which the devices are connected generally consists of four conductors: one pair for power (power bus) and one pair for communications (communications bus). These devices can be networked together on a single level. However, a more typical network configuration is for the devices to be organized in multiple levels, forming a rooted tree structure. In such a typical tree structure, it is desired that every branch be tied to a common power bus, but it is desirable for each branch to have separate communication busses in order to avoid bandwidth limitations resulting from using a common communications bus. An example of a typical network configuration consisting of a two-level network with two branches or sub-networks is shown in FIG. 2. As shown, the first level consists of a T1, T2 and T3 device, and the second level consists of two branches—one branch rooted to a T2 device on the first level and the second branch rooted to a T3 device on the first level (devices connected on the same level or the slave devices connected to a master device in a tree structure are considered "downstream devices"). The network can have multiple levels and multiple branches or sub-networks. More than one branch or sub-network can be rooted at the same device.

Figure 3:
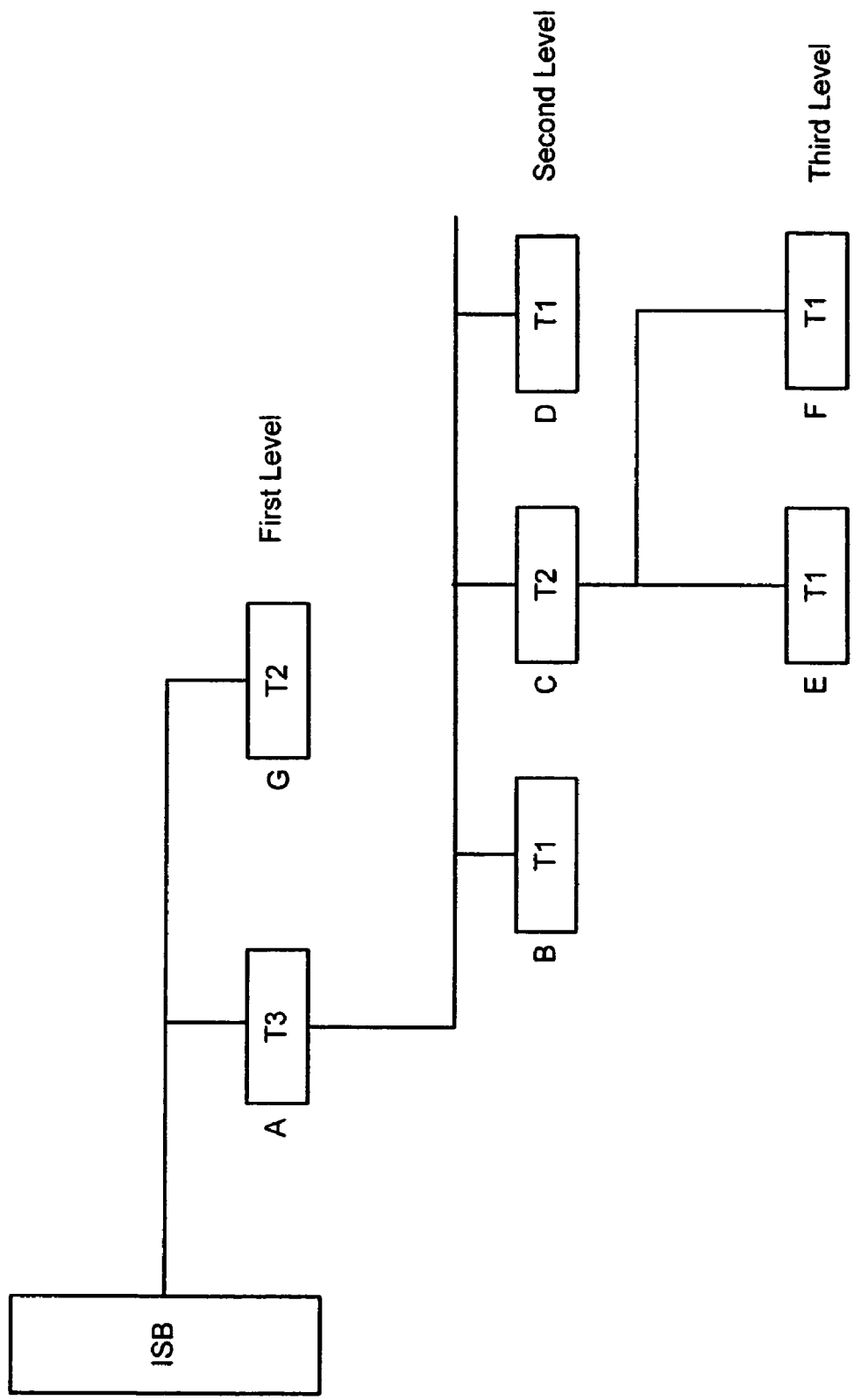
FIG. 3 is a schematic showing tiered devices distributed across the network structure.

In general, the root of a branch forms the host or master device for the devices on that branch or sub-network. The host or master has the ability to poll or query data and pass commands to those devices on its sub-networks. To accomplish division of measurement and/or control, if a level has sub-branch(es), such as depicted in FIG. 3, the root of the branch acts as master/host only for those devices in the network level immediately below the root. For instance, consider the three-level network shown in FIG. 3. The root of the second level is the T3 device denoted A. Device A acts as master for the devices in the level immediately below A—that is, the T1 device denoted B, the T2 device denoted C and the T1 device denoted D. However, device A does not act as the host for the sub-branch that is rooted at the T2 device denoted C; instead, it is generally preferred that the root of this sub-branch, device C, be the master/host for those devices in the level immediately below the root—that is, devices E and F. Device C also may have the means to query a device on the level in which it resides. This is the preferred communications and control architecture, as it provides for discrete control structures that expand the bus levels without burdening higher-level master/hosts with additional communications and control functions. For instance, T3 device A heeds only to communicate with the devices possibly slaved to A on A's immediate level (device G) or to devices slaved to A on its sub-branch communication bus (devices B, C and D). If device A requires data for computation from device E or F in the second level, device A typically accesses the data by requesting it from the root of that sub-branch (device C). Alternatively, the system may be configured to allow device A to access devices E and F directly by using the root or host of these devices (device C) as a routing gateway to pass the request for data to the sub-branched devices. In one embodiment, access is possible by providing each root with routing gateway capabilities (e.g. pass the address of the device to be queried, the slave, and the data request for routing though the root). As can be seen, devices downstream of a master are slave devices to that master; however, a master can function as a slave device to a higher tiered master device.

Figure 4:
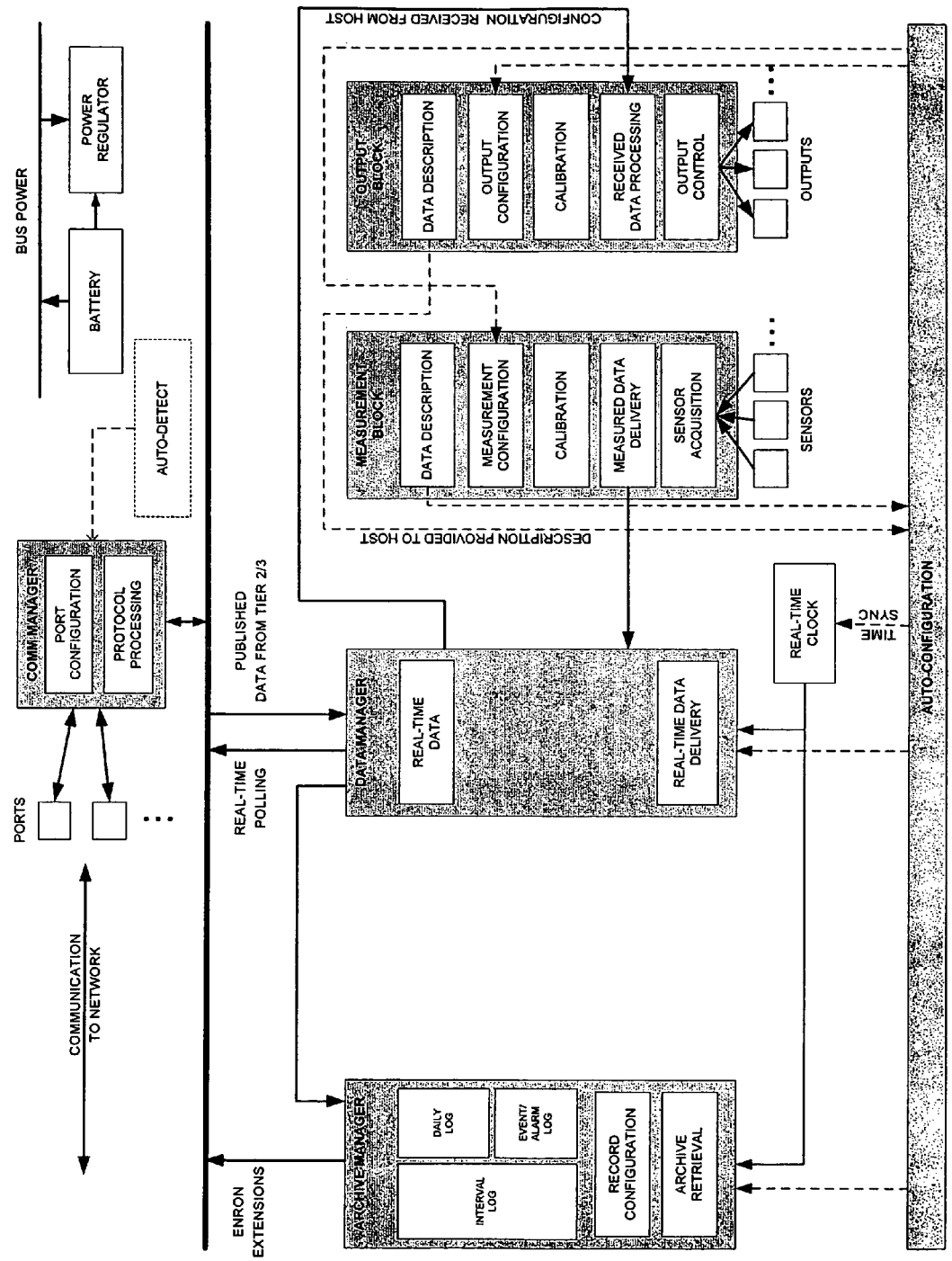
FIG. 4 is a schematic showing the general functional makeup of a tier 1 device, including data flow within the device.
Figure 5:
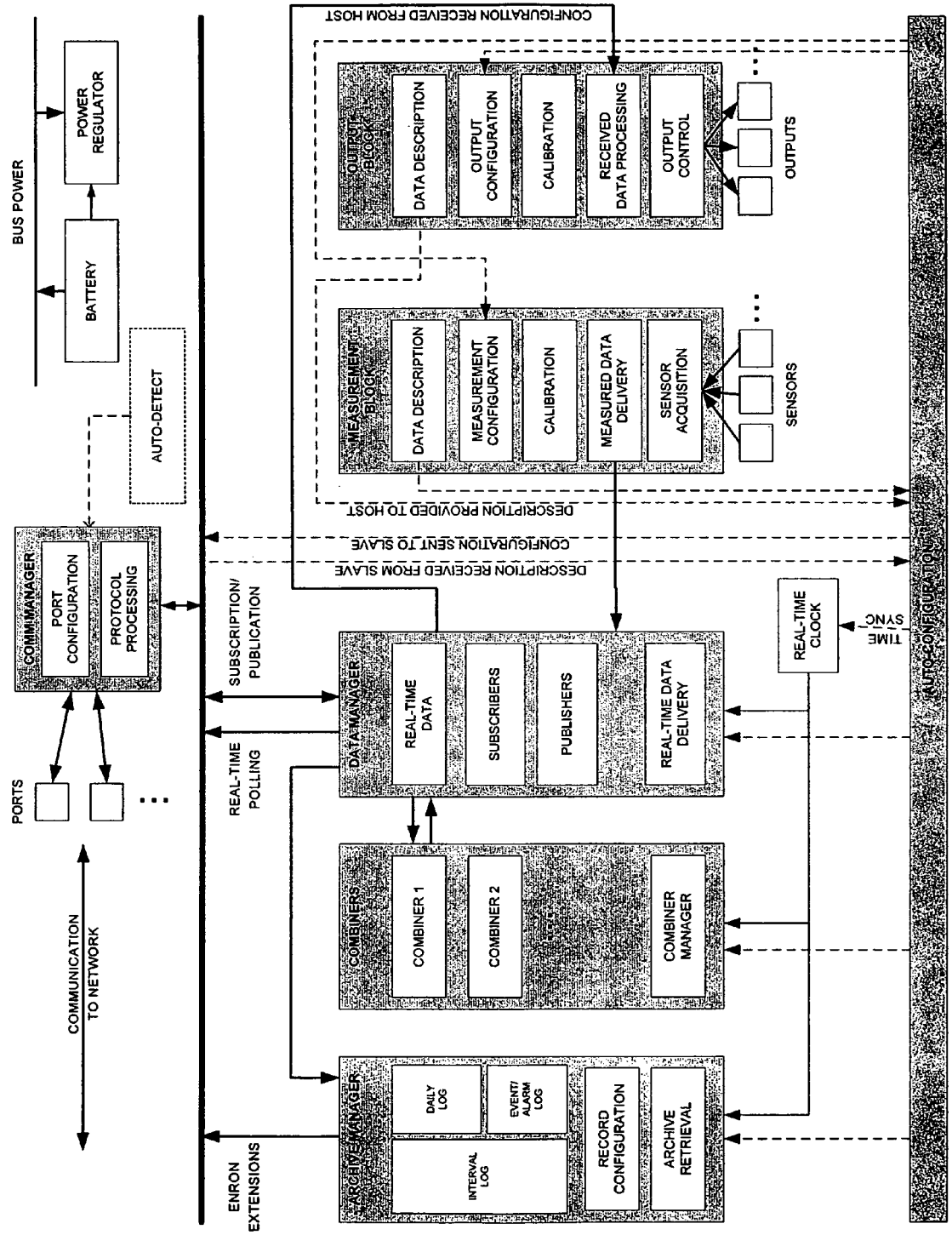
FIG. 5 is a schematic showing the general functional makeup of a tier 2 device, including data flow within the device.
Figure 6:
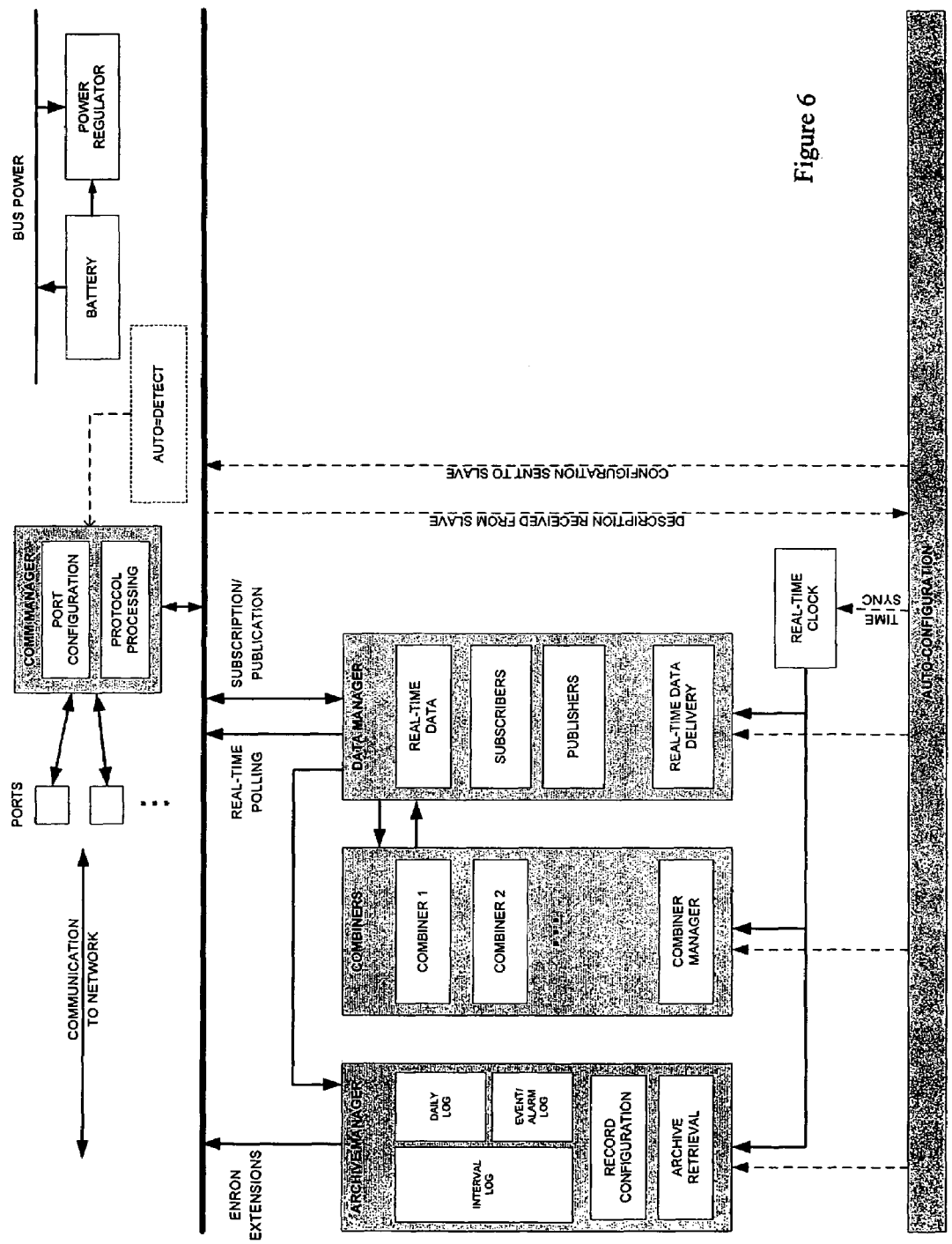
FIG. 6 is a schematic showing the general functional makeup of a tier 3 device, including data flow within the device.

Functional details of a general T1, T2 and T3 device are depicted in FIGS. 4, 5, and 6. As shown in FIG. 4, a T1 device has several functional areas: a communications manager, a data manager, a measurement block, an output block, and an archive manager. The measurement block collects sensor data, and contains all of the intelligence required to convert raw data as needed to represent accurate readings (e.g. correcting raw readings with calibration information over extended operating ranges and temperatures), and passes the converted data to the data manager. The data manager passes the sensed data to the archive manager for archiving in accordance with the stored archive configuration(s). The data manager may push real-time data onto the communications bus through the communications manager for proper formatting of the data for transmission in response to a request for real-time data. The archive manager may push data or transmit onto the communications bus in response to a query received by the communications manager. As shown, the data manager may also receive data published from a higher-level device. Data published to the device by a host/master is placed in the data manager where it is then accessible by the rest of the device (i.e. output block, archive manager, etc.). A resident output block monitors the data in the data manager and contains all of the intelligence for controlling on-board output circuitry to ensure that the output represents the data in the data manager. For instance, a flow control valve may be connected to a T1 slave device. A higher-level device may determine the need to close that valve, and will send the command to close the valve over the communications bus directed to the T1 slave device. Other aspects of data flow in the T1 device are shown and will be discussed later. Not all functional areas shown will be present in all T1 devices.

The archive for each device (T1, T2 and T3) may generally consist of three blocks: 1) a daily archive of average measurement points or combiner results for the day that are logged on the contract hour, 2) an interval archive in which time intervals can be programmed and generally coincide with the contract hour, and 3) an event archive that consists of records of user changes and alarm conditions. User changes are time-stamped records of configuration changes that affect the measurement point or calculated value, and alarm conditions are time-stamped changes in device conditions that affect the measurement point. The number of records in each log can be expanded with additional memory. The number of parameters in each record can be changed. All data within the device archive carries a timestamp that can be used to synchronize data from other devices and the host in the production of a consolidated archive report. Every device in the distributed network with a measurement point or combiner result contains sufficient amount of non-volatile memory to store its data for a minimum time period as determined by requirements of a higher-level device per each application. This creates a distributed archive structure, where the host device no longer constrains the entire system due to memory limitations. Archive data is stored on either removable or non-removable media. Archival retrieval is accomplished by, but not limited to, standard Modbus polling, Enron Modbus extensions, and/or direct device memory interfacing. Each master device associated with a measurement point or combiner has the intelligence to determine which configuration values and device conditions affect its measurement or calculation, and typically logs any changes in the values and conditions, including timestamps, the value before the change and the value after the change.

Shown in FIG. 5 are the functional blocks of a T2 device. As shown, the device has many common features of a T1 device, but includes potential additional features within the data manager (subscribers and publishers) and a new functional block, the combiners. Combiners are stored algorithms for processing data within the resident data manager. Data within the resident data manager may originate from sensors tied to the T2 device, or from other sensors that are "queryable" by the T2 device or in direct communication with the T2 device. Generally, the queryable devices are 1) a subset of devices on the same level as the querying T2 device and 2) devices for which the T2 device acts as a root of a branch—that is, devices on the level immediately below the T2 device. (As noted previously, other devices may also be queryable though gateway routing). The combiner manager schedules the computations as needed, and subsequently passes requests for data to the data manager and places the resultant back into the resident data manager. Embodiments of the combiner module functions range from simple arithmetic and monitoring of threshold and alarm conditions to advanced thermodynamic algorithms such as AGA-3, AGA-7 and AGA-8.

Two additional areas in the data manager handle incoming and outgoing requests for data. The subscriber area contains the instructions for acquiring data from a queryable device and places the data in the data manager to be used by the combiner or archive manager. For instance, data may be needed from a slave temperature probe and a slave pressure probe. The subscriber area contains the addresses of the desired probes and the type of data or data structure to be acquired. Upon a request from the combiner manager, the data manager forms the request to be placed on the communication bus through the communications manager.

The publisher area contains the instructions for pushing data from the resident data manager to a resident output block or the data manager of a queryable device. The publisher area is the typical means by which a T2 device transports control information to one of its slave devices.

FIG. 6 shows the functional blocks of a T3 device. The T3 device resembles a T2 device, except that the output block and the measurement block are absent. A T3 device is generally a computational and communication device that typically contains larger implementations of subscribers, publishers and combiners than that of T2 devices. It is also preferred that T3 devices have numerous communication ports that can act as slaves or masters.

Each device has been optimized to minimize power consumption with both hardware and firmware design techniques, which include component selection and use. It is preferred that each device has the ability to automatically monitor power consumption and adjust its current consumption, enabling operation in a variety of power modes as required, from very low-power to high-power mode. This is achieved by self-controlling the CPU clock source, and intelligently controlling sensor excitation circuitry. Power levels may be set by the needs of the function being performed. For example, during advanced CPU-intensive calculations or during high-speed communications, the device can increase its CPU clock.

Each of the devices may be comprised of the following (depicted in FIG. 1):

1. A microcontroller (in some instances, a PLC may suffice) for handling the measurement block, archive retrieval, combiner, data delivery, combiner function, data management, auto-detection, auto-configuration, timekeeping and communications, and associated non-volatile memory.
2. Communication drivers (RS-485 transceivers) for implementing the physical layer of the communications.
3. Power regulator for managing the system voltage based on bus power or battery voltage.
4. An optional battery that can provide power to its local device and may contribute additional power to the power on the bus.
5. A sensor or sensors for providing raw measurement signals to the measurement block.
6. A data acquisition section that provides the controllable excitation source for the sensor, conditions the signal(s) from the sensor(s) and converts the analog signals to digital values for the microcontroller. The microcontroller contains the algorithms and calibration data for producing the measurement point.
7. An output conversion and control block that collects the digital values from the microcontroller, converts the signal to analog form and controls the output circuit to create the desired output.
8. An optional local display for viewing data from the data manager or archive.
9. An optional keypad for allowing local configuration and changing settings.
10. A real-time clock that can be synchronized with a local and remote host. Its real-time is calibrated from −40 to +60 deg C. and has an accuracy of +/−1 second/day.

The functional blocks have been described for ease of understanding. In an implementation, functionality is generally encoded in the microprocessor and the functional areas may share code. To demonstrate the functionality of the system, examples of T1, T2 and T3 devices follows.

Tier 1 Device Sample Implementation—Temperature Sensor/Transmitter

The temperature transmitter converts and records the temperature information generally from a 100-ohm platinum resistive thermal device (RTD). The preferred construction of the measurement block on this device typically contains a 24-bit analog-to-digital converter (ADC) configured within a half-bridge excitation circuit which ratio-metrically measures a voltage across the RTD. Data from the RTD measurement block is placed into the data manager in the form of a temperature reading that is useful to host devices. The measurement block within this device also contains the algorithm for converting the voltage measured at the RTD into an electrical resistance that is proportional to the temperature of the RTD. A second algorithm then relates the resistance to a measurement of temperature. Host devices receive only the temperature reading and are not required to understand any of the algorithms required to produce that information. The temperature transmitter creates and maintains an interval, collects daily archive data containing the average temperature over the log period, and stores this data in local non-volatile memory. It also creates event records as the operator performs field calibrations. The temperature transmitter contains a real-time clock that can be synchronized with a local/remote host. The clock is calibrated from −40 to +60 deg C. and has an accuracy of +/−1 second/day. Through the data manager and archive manager within the transmitter, the temperature and archive data is available to a host for use in a larger system. This provides archiving and measurement calculations without burdening the larger system with measurement or archiving duties. The temperature transmitter generally has one serial port that is implemented as a Modbus slave. The physical body of the temperature transmitter is such that it can be attached to a wiring hub containing a terminal block and a battery. This battery allows the device to operate for a long period of time without external power and gives the device the ability to contribute power to the bus. The temperature transmitter can operate with third-party Modbus equipment and respond to real-time requests for temperature data. Its internal archives can also be retrieved by third-party hosts via Enron Modbus extensions. The temperature transmitter can adjust its current consumption by increasing or decreasing its CPU clock speed, or by controlling the sensor excitation. The temperature transmitter does not contain any output blocks or output circuitry.

Tier 2 Device Sample Implementation—MC-III

The MC-III is a T2 device that measures liquid or gas flow, generally through turbine flowmeters. This device is available from NuFlo Technologies, Inc. The MC-III contains both measurement and output blocks. It creates and maintains the data structures within its data and archive managers for the measurement and output blocks so that it can provide full T1 functionality to a host. A preferred construction includes two serial ports: one to act as a slave, the other to act as a master for sub-networked devices. The MC-III measurement block contains two turbine measurement blocks, each monitors a turbine pulse input. The on-board data manager is automatically subscribed to the data generated from each turbine. The MC-III has an output block that contains three optically isolated digital outputs and a liquid crystal display (LCD). The on-board data manager automatically publishes to these output sections. The MC-III also contains a local keypad that is used with the LCD for configuring the unit manually and for displaying archive and real-time data. The MC-III creates and maintains an interval and daily archive data that typically contains the flowing volume and flowing time over the log period, and stores this data in local non-volatile memory. The on-board data manager contains publishers and subscribers for hosting slave T1 devices. Typical slave devices include a pressure transmitter and a temperature transmitter for temperature- and pressure-compensated gas measurement. The MC-III has non-volatile memory dedicated to the storage of combiners, and its data manager can access and execute these combiners. A typical combiner uses the data from one of the integrated turbine blocks, the temperature from a slave temperature transmitter and the pressure from a slave pressure transmitter to calculate gas volume corrections based on industry standard algorithms.

Tier 3 Device Sample Implementation—Well Site Server

The Well Site Server is a low-power implementation of a T3 device. The Well Site Server has a large non-volatile memory dedicated to the storage of combiners. Its on-board data manager gathers data from slave devices by means of subscriptions, creates additional value-added information with combiners, and can place this new data into output blocks of slave devices by means of publishers. A typical implementation of the Well Site Server has four serial ports, each of which can operate as a master or slave port. This construction allows the Well Site Server to present multiple T1 and T2 slave devices to a host with just a single interface, adding a new degree of scalability to the larger system. The Well Site Server primarily functions as a data collector and archive transporter. Its on-board archive manager can randomly access the archive managers of slaved devices, creating a seamless, yet distributed archive. The Well Site Server also contains high-level communication protocols for interfacing with third-party data gatherers. The Well Site Server contains no measurement or output blocks.

Examples of the types of devices suitable for incorporation in the network and grouped by tier include Tier 1
Temperature sensor
Pressure sensor—a static pressure sensor
DP sensor—a differential pressure sensor
HMI—a human-machine interface device which consists of a keypad and display
Analog I/O—an expansion module that provides analog input and analog output
Digital I/O—an expansion module that provides digital input and digital output
Memory—an expansion module that provides additional data logging
Display—a display-only device for published data
Wireless—a wireless interface for the system components
Personality Module—an interface for legacy devices
ISB—an intrinsically safe barrier
ISB advanced—an IS barrier with advanced connections such as USB and removable memory on the non-hazardous side
MVX—a multivariable sensor (static and differential pressure, temperature)
PreAmp—a turbine flowmeter sensor
Tier 2
EVC—an electronic volume corrector
MC-III Flow Analyzer—a flow analyzer for measuring gas and liquid through two flowmeters
MicroEFM—a flow computer for gas, liquid, steam
WaterCut—a device that determines the amount of water in oil
Net Oil Anaylzer—a device the calculates the amount of oil and water flowing and performs well tests
Sample Controller—a device that controls liquid and gas samplers
LGS—a liquid and gas sampler with an integrated sample pump
Tier 3
Well Site Server—a low-power T3 device intended for data concentration and communications
Interface Software—a software application for configuration, calibration, download, reports, database management, charting, control applications, and security
Industrial Controller—an advanced, feature-rich T3 device intended for data concentration, communications and advanced control; this can be implemented on PC or mainframe.

Some of these devices are available from NuFlo Technologies, Inc, for instance, from their Houston office. With a variety of devices positioned on the system network or sub-network(s), each master device must be aware of every device slaved to it on its level or its sub-network(s). Also, the master device must be aware of the capabilities of each slave device, as the master device may require data from a slave device or be responsible for publishing control data to a slave device. The configuration of protocols and communications between devices may vary from network to network; hence, it is desired to have a system that will automatically recognize devices on the network and the configuration of the devices on the network, that is, to have a means to detect other devices on the network and the other device's available characteristics, and that will be able to set the configuration of each detected device as required. For this purpose, the system employs an "auto-detection" sequence and an "auto-configuration" sequence.

Figure 7:
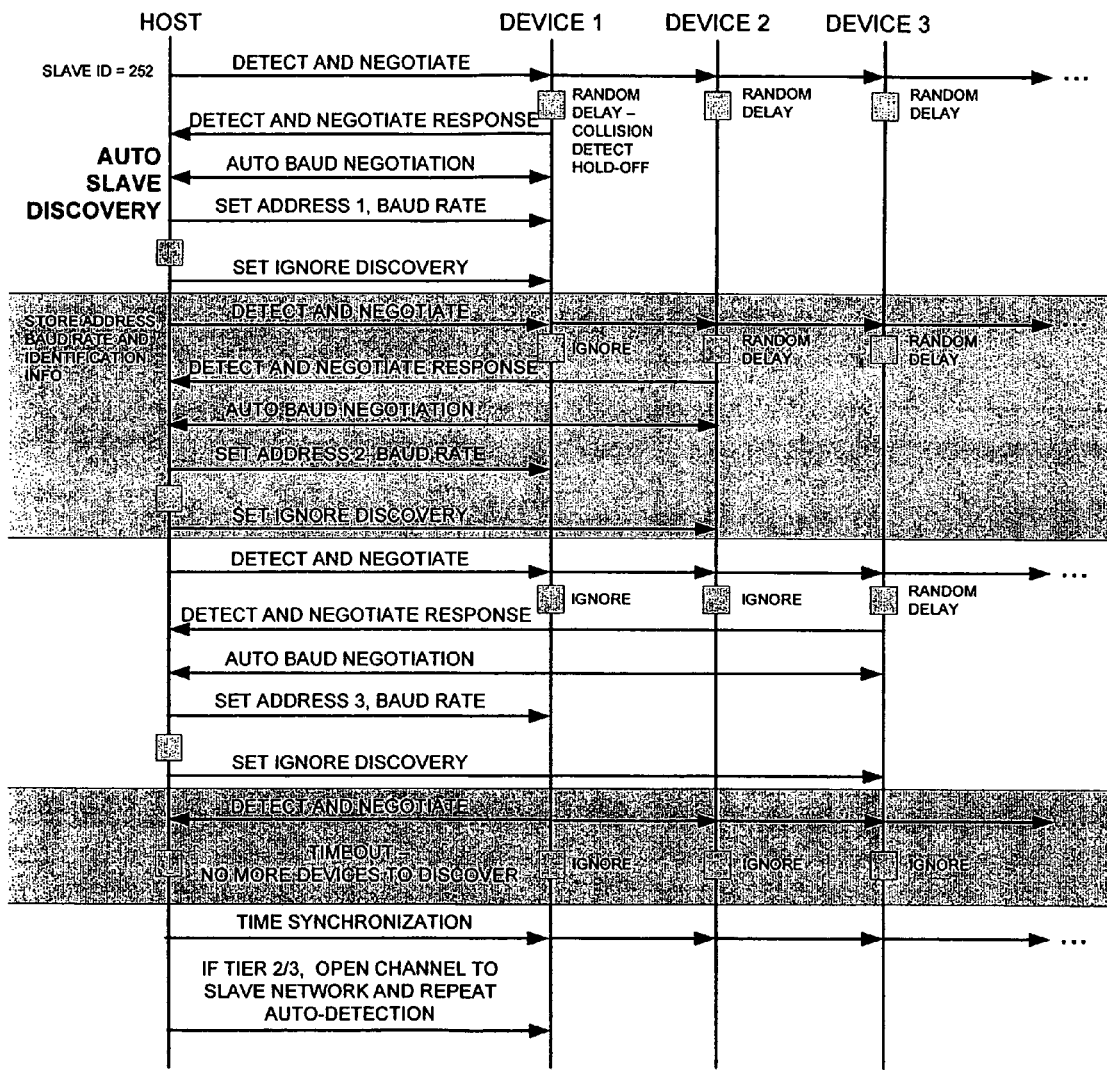
FIG. 7 is a schematic showing the general communication flow within one embodiment of an auto-detection scheme.

One means to detect devices is an auto-detection sequence that employs a method to identify the devices attached to the network. Every device on the network has a series of communication ports; some are slave ports and some are master ports. Typically, T1 devices have only slave communication ports. T2 and T3 devices can have an active master port, which implies that the "master" T2 or T3 device is positioned at the root of a branched tree and/or communicates with other devices on the same network level as the master device. Hence, each master device must determine what other devices are tied to it as slave devices. To accomplish this, each master broadcasts a "please identify" signal over its associated slave sub-network(s). Slave devices listening over slave ports recognize the request for identification and respond accordingly. An example of this auto-detect scheme is shown in FIG. 7. The master device sends a "detect and negotiate signal" over its master port. This signal is recognized by devices tied to the master through slave ports as a "please identify" signal. To avoid multiple devices responding simultaneously to "detect and negotiate" signals, each slave device produces a random response delay that must expire before the slave can respond to the "detect and negotiate" signal. If during the random response delay, another slave device responds to the "detect and negotiate" signal, this response is recognized by the remaining slave devices and the remaining devices remain silent, not responding. This is one instance of a "collision avoidance" scheme to avoid simultaneous device responses. Other collision avoidance schemes are known in the art. The auto-detection block monitors all communication for destructive interference to the packet caused by a network collision as well as network activity while a transmission is pending.

Figure 8:
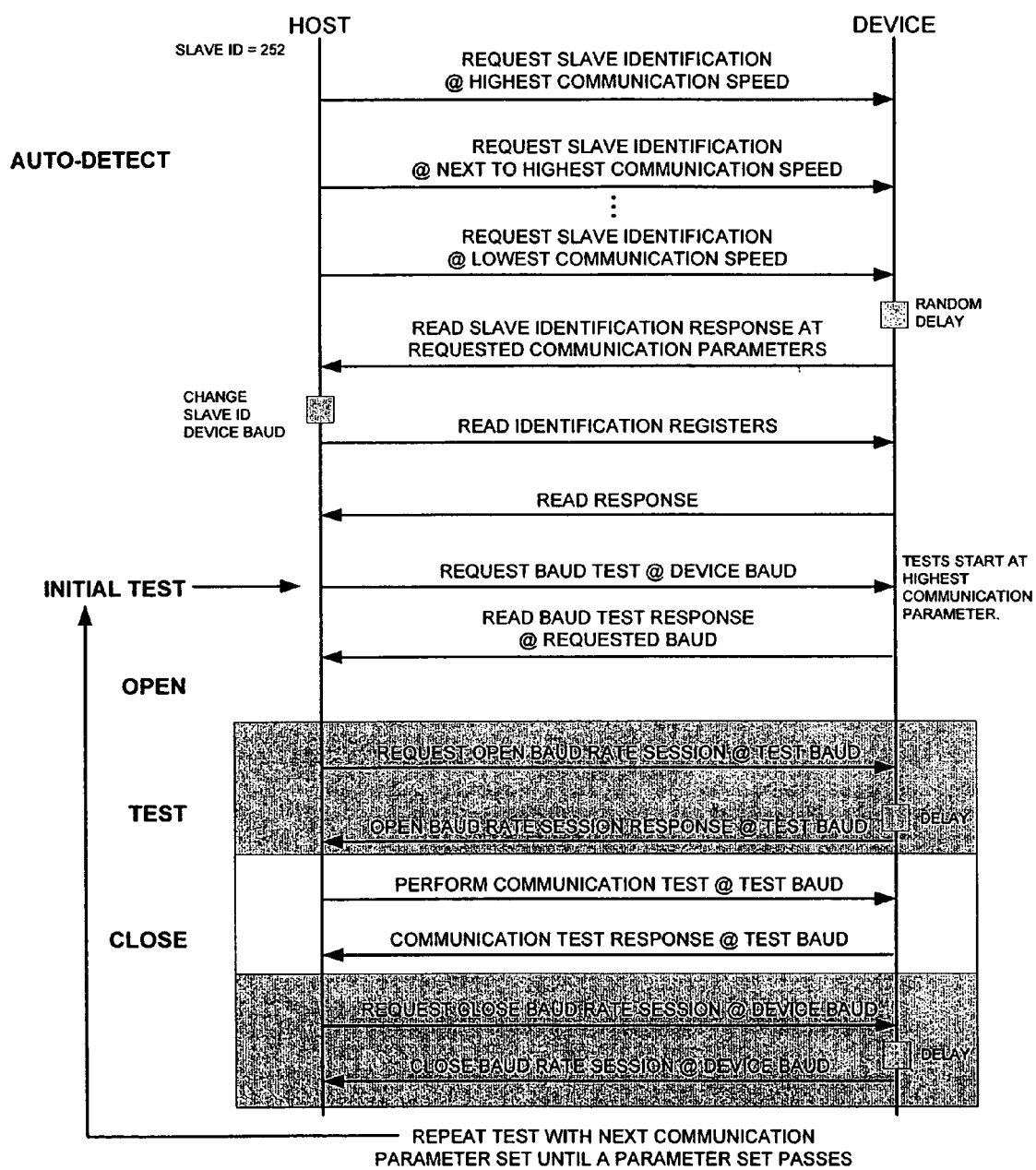
FIG. 8 is a schematic showing the general communication scheme within one embodiment of a session to automatically detect networked sensors and their respective communication parameters.

The first responding slave device enters into a dialogue or "negotiation" sequence with the master device to exchange slave communication parameters. One negotiation sequence is depicted in FIG. 8. As shown in FIG. 8, upon completion of the negotiation sequence, the master is aware of the slave device, has identified the communication baud rate of the slave device and other relevant communication parameters, and has assigned an address to the slave. The master device sends the slave address information to the slave device for storage and later communication. As shown, a confirmation or test sequence is also included in the negotiation sequence to confirm communication parameters. Once the first slave device is identified, it will no longer respond to another "please identify" signal from the master device within a given time window. As shown in FIG. 8, one option for preventing repeat responses from an identified slave is to have the master send an "ignore discovery" signal to the identified slave device.

At the conclusion of the communication with the initially discovered slave device, the master device will send another "detect and negotiate" signal, and the process is repeated until all slave devices that communicate with the master have been identified by the master and no further device responds to the "detect and negotiate" signal. Note that a master device may be a slave device to another equal or higher-tiered device, and hence, will respond to its master devices' "detect and negotiate" signal. The auto-detect feature can negotiate optimal communication parameters with discovered devices. Communication parameters that are optimized include communication speed, the Modbus slave address and basic and extended protocol capabilities such as timing parameters. Optimization of communication parameters is achieved by allowing the host to communicate with every device on the bus with unique communication parameters that are the fastest and most reliable connections for each device. This adaptability ensures optimal communications for with varying cable lengths, and allows for connections with multiple devices operating with different communication parameters on the same port/bus. For example, a master device communicating to a slave at 9600 does not prevent the master from communicating to a second slave device through the same port at a higher baud.

The "detect and negotiate" sequence is generally initiated by a T3 device upon startup of the network. A typical initiating device is a user-operated PC tied to the network through the IS barrier. Generally, a "detect sequence start" signal is sent to all devices at the level of the initiating T3 device. Each master device on this initial level then works independently to detect and negotiate with those slave devices queryable to it. Other means of initiating detect sequence are possible; for instance, each master can have a pre-assigned address value, and a sequence start signal can be sent to each master via its address. As described, the auto-detect feature allows initial communication to the device regardless of existing communication parameter settings such as slave address and baud rate, and allows for rapid device identification without having to search the network for devices or manually configure the device in advance. Undiscovered devices connected to the bus can be detected individually, even in the case of conflicting communication parameters. As described, the auto-detect features are a means of automatically detecting the communication parameters of the slave devices.

The auto-detection functionality involves the monitoring of all communication for destructive interference to the packet caused by a network collision as well as network activity while a transmission is pending. Once the communication parameters are established between slave and master devices, the master will identify each slave device by type and determine its capabilities, as the master may require data from the slave and will have to ensure that the slave is configured to transmit the desired data in a timely manner. The master device may have a database where possible remote device characteristics are stored and upon receiving the remote device identification, the master will "know" the remote device's characteristics. Alternatively, the remote may communicate its characteristics to an upstream master device (T2 or T3). Both means to determine device characteristics are considered means to configure or "auto-configuration."

Figure 9:
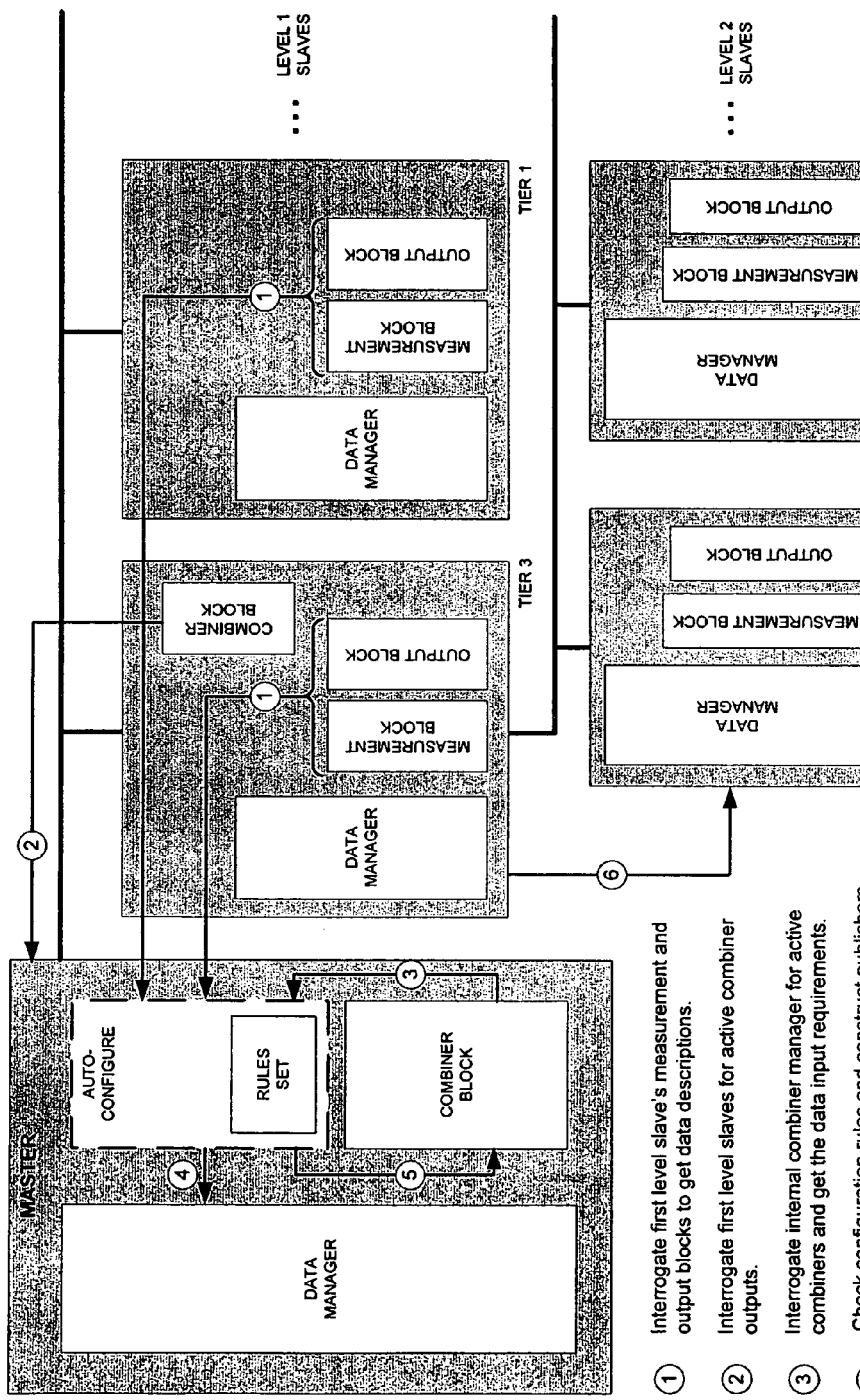
FIG. 9 is a schematic showing the general communication scheme between master and slave devices distributed across the network during an auto-configuration session.

One example of such an auto-configuration scheme, where the remote communicates its characteristics to the master, is shown in FIG. 9. Each device is coded internally with the type of device (e.g. temperature sensor), measurement configuration (degrees C. or degrees F., readings at every 30 seconds, etc.), archival capabilities and limitations (daily logging or averaging, hourly logging capabilities, etc.), possible outputs and types of output (e.g. output 1: 4-20 mA, output 2: RS-485), calibration information or calibration settings, combiner outputs, combiner inputs, etc., or some portions of such information. The master requests measurement and output information from each slave device. Additionally, the means to configure can include determining a remote slave device's combiner capabilities, in which event the master will determine the available combiner outputs for use by the master device. Note that this auto-configuration or means to configure can be performed during the detect and negotiate sequence or at a later time. In some embodiments, programming or combiner algorithms may be pushed by the master onto the slave device, but the following description assumes the combiner algorithms are fixed. The master will know its own combiner capabilities (if needed, the master may query its combiner manager for information). From the possible slave data and archival availability, slave output capabilities and slave combiner outputs, the master can build subscription rules to query slaves for data as needed by the master combiner algorithms (e.g. type of data required, frequency of data, etc.). With knowledge of the slave output capabilities, the master can configure publication rules as needed to associate particular devices with particular outputs. The creation of these subscription and publication rules may require user input, or be stored in database files in the memory of the master device. Once the publisher and subscriber rules for each slave device have been constructed within the master, data flow into and out of the data manager will begin. The master associates the data within the data manager with the data requirements and outputs of its own combiners; this process is repeated for each slave communication port on the master. As described, the auto-configuration features are considered a means of automatically configuring data transmissions between master devices and slave devices.

As described, the auto-detect and auto-configuration functions are performed as a one-time process at the setup of a system in which all data managers and archive managers are configured to coexist with the other devices on the bus. Each device allows itself to be configured by its master or host so that it can coexist with unknown peer devices. The host follows expandable configuration rules in configuring all detected slave devices on the bus to coexist and provide needed data. Given the identification parameters of a device and knowledge of other devices on the bus, an algorithm is implemented to determine the communication parameters that will be assigned to that device. The identification parameters include product ID, firmware version and other parameters that uniquely identify the device being configured. Finally, the auto-configuration scheme provides an intrinsic method of synchronizing a device's internal real-time clock to the clocks of other devices on the bus, minimizing synchronization errors due to network lags or message delivery latency time.

The auto-configuration features function within the data manager to organize and deliver values retrieved through subscriptions to slave device data. Organization of data points follows expandable configuration rules. Data presented by a slave device can be determined and logically positioned within a data structure in the data manager. When queried, a host can thus produce a consolidated report in which data contained within each member of the bus appears as though all distributed sensors/devices are part of a single integrated device. Auto-configuration thus enables the organization of data collected from slave devices within the master's data manager so that it can be used in combiners to produce value-added information. Once organized, the data can be used in the calculation of more complex information. Additionally, it allows a host's or master's internal archive manager and data manager to be presented as though it is part of a larger system.

Figure 10:
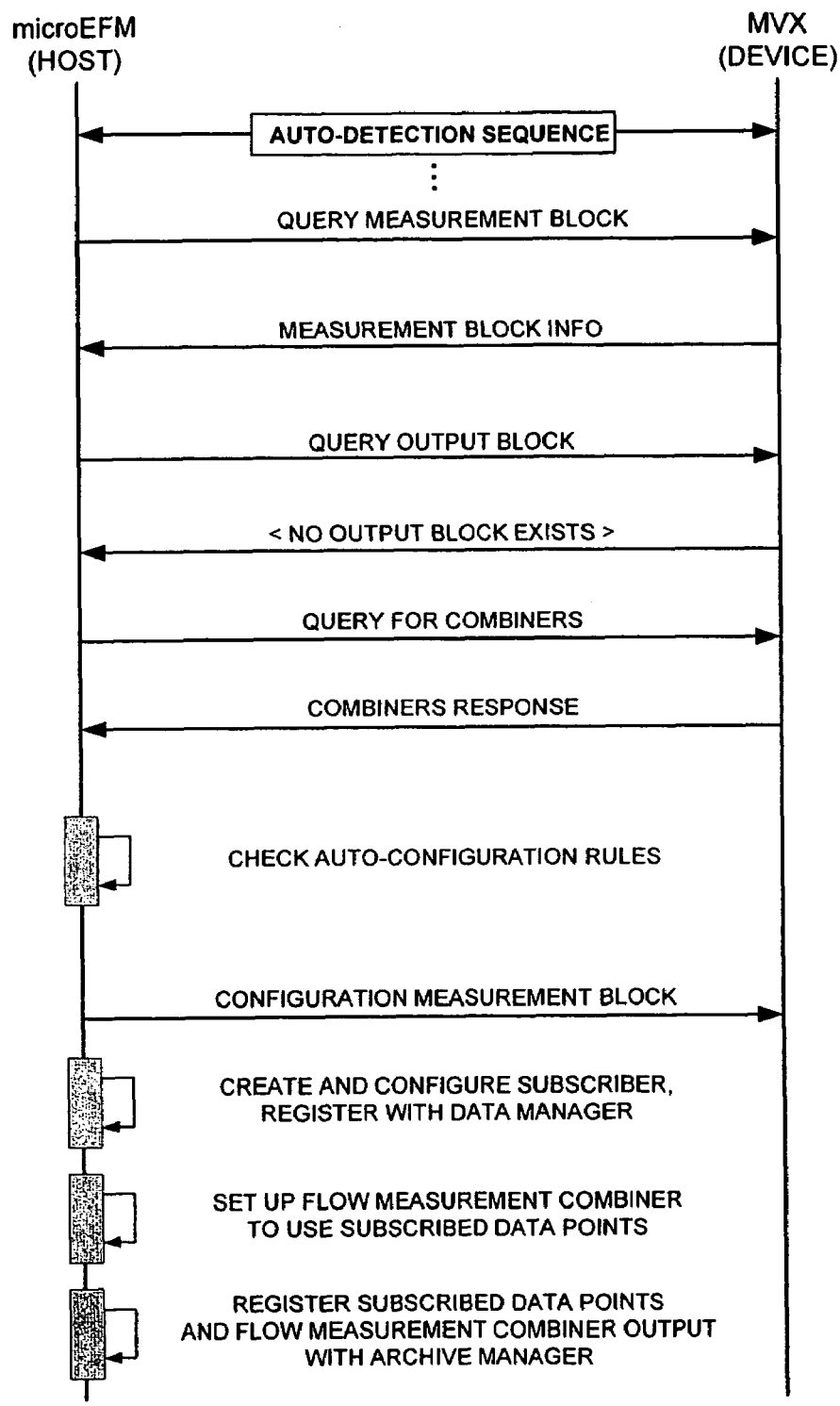
FIG. 10 is a schematic showing the example of communications between a specific master and slave device during an auto-configuration session.

An example of the auto-configuration process is shown in FIG. 10. This example shows a MicroEFM as the master device and an MVX as the slave device. Assume that the master device has already performed the auto-detect process and has discovered and set up the communication with the slave device. Now, the master device interrogates the slave to discover if it has a measurement block and/or an output block within it. The slave reports that it has a measurement block containing 3 data points (differential pressure, static pressure, and production temperature) and a status register. It does not contain an output block. The master then queries the slave for any available combiner outputs and finds none. Next, the master checks an internal set of rules, using the following pieces of information as inputs: the type of slave device detected, the type of measurement block and data points in the slave device, the types of combiner outputs available in the slave device, and the types of combiners resident within itself. In this example, the rules indicate that the slave should be configured as a remote multivariable transmitter to feed an AGA-3 driven orifice plate flow measurement combiner. The master will then configure the measurement sample rates of the 3 data points in the slave to match the requirements of its flow measurement combiner. A subscriber is created within the master device to read the 3 data points from the slave at the required sample rate, and is registered with the data manager. The data points will now appear in the real-time data block of the data manager. Next, the flow measurement combiner is configured to use the newly available data as inputs. The outputs of the combiner are also directed to the real-time data block. The 3 subscribed data points and the flow measurement output are all registered with the archive manager, and become part of the archive data record. The auto-configuration process is now completed, and the master device's data manager will immediately begin executing the new configuration.

As described, the system provides a flexible and expandable solution for operating in a hazardous area. The wired communications network can be replaced partially or totally with a wireless communications network. The power network component may also be eliminated partially or totally. Partial removal of the power component requires the connected devices to be powered by local battery power. The slave devices generally respond only to queries, and are generally autonomous devices once the slave device's available functional characteristics have been recognized and selected by its controlling master device during the auto-configuration process. However, the slaves can be implemented with the ability to alert or alarm their master controlling device if sensed data is outside or approaching a critical range, for example, if static pressure is too high, etc. In this fashion, the slaves could post an interrupt sequence on the communications port that is recognized by the master and initiate communications concerning the alarm.

As described, the networked system is a distributed network of intelligent tiered devices, organized and communicating in a hierarchical structure. Within this structure, the master/slave devices have the ability to automatically detect downstream devices and device characteristics, and to automatically configure downstream devices as needed by upstream devices. It is preferred that the devices downstream from an IS barrier share a common power bus, allowing any battery on the bus to be used as a power source by any device on the bus in the event of a power interruption, providing for a very robust design.

The networked system combined with low-voltage and low-power requirements make possible a simplified approach to designing and implementing an intrinsically safe network and enable cost reduction by eliminating the need for large, expensive enclosures and power systems. The design allows for a system designed for specific measurement and control applications by combining a set of functional components in a manner that addresses exact system requirements, and allows for system expansion to meet new requirements through the addition of new components without removing existing components. Finally, the system creates an advantageous business model in which the quoting and system design stages are able to exactly meet the system requirements; where the system contains no unused capabilities, and which reduces manufacturing cost by not having to test instrument capabilities that are not used in the application. The networked devices can be implemented on a reusable hardware and software structure that is reduced to the scope of its intended function so that changes and development test time are constrained to a small portion of the overall functionality.

The described system demonstrates the auto-detect and auto-configuration features performed through an IS barrier between a safe area and a hazardous area. The auto-detect and auto-configuration can be performed in absence of an IS barrier if either explosion-proof safety techniques are employed within the hazardous location or all devices are located within a non-hazardous location. In addition, the processes of simple IS calculation, auto-detection, and auto-configuration are not mutually dependent. They may be implemented on their own or in different combinations in a network of suitably enabled devices.

We claim:

1. A networked system of devices positioned in a hazardous environment to monitor process conditions, comprising:
   an intrinsically safe barrier ("ISB") having a safe side and a hazardous side,
   a network connected to said hazardous side of said ISB,
   at least one sensor located on the hazardous side of said ISB, said sensor detecting process or ambient conditions,
   at least one slave device of a plurality of slave devices connected to said network, said slave device including a microprocessor and memory to receive and record said sensor data,
   at least one master device connected to said network, said master device and said slave device communicating to one another through a digital communications sub network of said network, wherein said sub network is a tier of said network such that said master device acts as a master only to those devices of the plurality of slave devices connected to the sub network;
   said master device adapted to request portions of said recorded data from said slave device through said communications sub network and said slave device adapted to transmit said requested data to said master device through said communications sub network in response to said request;
   said master device further adapted to manipulate said received slave data, said master device further being adapted to transmit said manipulated data on said communications sub network.

2. The networked system of claim 1 having a series of slave devices and a series of master devices, a subset of said series of slave devices in communication with a subset of said series of master devices through said communications sub network and forming a hierarchical network of devices in a master/slave tiered relationship.

3. The networked system of claim 2 wherein said communications sub-network includes a separate communications bus for each tier of said hierarchical network.

4. The networked system of claim 1 wherein said master device includes a memory to store said manipulated data.

5. The combination of the networked system of claim 2 and an external master device located on said safe side of said ISB, and wherein said master device located on said hazardous side of said ISB transmits said manipulated data to said external master device in response to a request for data from said external master device.

6. The networked system of claim 3 wherein said network further includes a power distribution sub network, said power distribution sub network receiving power external to said network and distributing power to said series of master devices and said series of slave devices positioned on said network along a common power bus.

7. The networked system of claim 6 wherein a subset of said slave devices or said master devices each are equipped with a replaceable battery, said battery quipped slave devices are adapted to distribute power through said power distribution sub-network when said external power is insufficient or lacking.

8. A networked system of devices positioned in a hazardous environment to monitor process conditions, comprising:
   an intrinsically safe barrier ("ISB") having a safe side and a hazardous side, a network connected to said hazardous side of said ISB,
   at least one sensor located on the hazardous side of said ISB, said sensor detecting process conditions,
   at least one slave device of a plurality of slave devices connected to said network, said slave device including a microprocessor and memory to receive and record said sensor data,
   at least one master device connected to said network, said master device and said slave device communicating to one another through a digital communications sub network of said network, wherein said sub network is a tier of said network such that said master device acts as a master only to those devices of the plurality of slave devices connected to the sub network;
   said master device adapted to request portions of said recorded data from said slave device through said communications sub network and said slave device adapted to transmit said requested data to said master device through said communications sub network in response to said request;
   said master device further adapted to manipulate said received slave data, said master device further being adapted to transmit said manipulated data on said communications sub network, wherein said system further includes a means to automatically detect the communication parameters of said slave devices.

9. A networked system of devices positioned in a hazardous environment to monitor process conditions, comprising:
   an intrinsically safe barrier (ISB") having a safe side and a hazardous side, a network connected to said hazardous side of said ISB,
   at least one sensor located on the hazardous side of said ISR, said sensor detecting process conditions,
   at least one slave device of a plurality of slave devices connected to said network, said slave device including a microprocessor and memory to receive and record said sensor data,
   at least one master device connected to said network, said master device and said slave device communicating to one another through a digital communications sub network of said network, wherein said sub network is a tier of said network such that said master device acts as a master only to those devices of the plurality of slave devices connected to the sub network;
   said master device adapted to request portions of said recorded data from said slave device through said communications sub network and said slave device adapted to transmit said requested data to said master device through said communications sub network in response to said request;

said master device further adapted to manipulate said received slave data, said master device further being adapted to transmit said manipulated data on said communications sub network wherein said system further includes a means to automatically configure the data transmissions between said master device and said slave device.

10. The networked system of claim 6 wherein said power distribution sub network is configured for delivering power at a voltage below approximately 6 volts DC, at a maximum amperage of about 3000 milliamps, having a maximum capacitance of approximately 450 uF of capacitance.

11. The networked system of claim 7 wherein said battery backup is sufficient to operate for a period of more than 1 year at the power distribution configuration of claim 10.

12. The networked system of claim 1 further having a series of sensors and slave devices located on said hazardous side of said ISB, each slave device associated with one of said sensors, each slave device adapted to receive and record data from said associated sensor, each of said slave devices in communication with said master device through said communications sub network, and each slave device communicating said recorded data to said master device upon request for data from said master device.

13. A networked system of devices positioned in a hazardous environment to monitor process conditions, comprising:

an intrinsically safe barrier ("ISB") having a safe side and a hazardous side, a network connected to said hazardous side of said ISB, a plurality of sensors located on the hazardous side of said ISB, each of said sensors detecting process or ambient conditions, a plurality of slave devices connected to said network, each of said slave devices including a microprocessor and memory to receive and record an associated sensor's data, a plurality of master devices connected to said network, each of said master devices receiving data (a "receiving master device") from zero or more of said plurality of slave devices through a digital communications sub network of said network in response to a request for data sent from said receiving master device addressed to a particular one of said stave devices, wherein said sub network is a tier of said network such that said master device acts as a master only to those devices of the plurality of slave devices connected to the sub network;

said receiving master devices adapted to manipulate said received data and store manipulated data or said received data and transmit said stored received or manipulated data to another of said plurality of master devices upon a request for transmission from said another of said master devices.

14. A low powered configured inherently safe network of devices positioned in a hazardous environment to monitor process conditions, comprising:

an intrinsically safe barrier ("ISB") having a safe side and a hazardous side, a network connected to said hazardous side of said ISB, a plurality of sensors located on the hazardous side of said ISB, each of said sensors detecting process or ambient conditions, a plurality of slave devices connected to said network, each of said slave devices including a microprocessor and memory to receive and record an associated sensor's data, where each slave device has capacitance of about less than 30 uF, and said slave device adapted to transmit said recorded data onto the network substantially only in response to a request for data by a master device received by said slave device transmitting the requested data, wherein one or more of said slave devices communicates with a master device over a sub network of said network, wherein said sub network is a tier of said network such that said master device acts as a master only to those devices of the plurality of slave devices connected to the sub network.

15. The low powered intrinsically safe network of claim 14 wherein said slave devices are powered through a single shared power bus.

16. A networked system of devices positioned in a hazardous environment to monitor process conditions, comprising:

an intrinsically safe barrier ("ISB") having a safe side and a hazardous side, a series of sensors and a series of slave devices on said hazardous side of said ISB, each slave device associated with at least one sensor and adapted to receive and record said associated sensor's data, a series of master devices, each master device communicating with a sub-set of said series of slave devices through a sub-branch communications bus, wherein said sub-set is a tier of said network such that each master device acts as a master only to those devices of the series of slave devices in the sub-set, each of said master devices adapted to request portions of said recorded data from each of said associated slave devices through said communications bus and said associated sub-set of said slave devices adapted to transmit said requested data to said requesting master device through said communications bus in response to said request;

each of said master devices further having a processor adapted to manipulate said associated slave data, said master device further being adapted to transmit said manipulated data on said communications bus to another of said master or slave devices.

17. The networked system of devices according to claim 16 wherein each of said master devices and subset of associated slave devices communicates over a separate dedicated sub-branch communications bus.

18. The networked system of claim 16 where said master devices are adapted to query each of said associated subset of slave devices to determine the communications capabilities of each associated slave device.

* * * * *